United States Patent
Badding et al.

[11] Patent Number: 5,919,571
[45] Date of Patent: Jul. 6, 1999

[54] COUNTERELECTRODE LAYER

[75] Inventors: Michael E. Badding, Bridgewater; Stephen C. Schulz, Princeton, both of N.J.; L. Charles Hardy, St. Paul, Minn.

[73] Assignee: Minnesota Mining and Manufacturing Company, St.Paul, Minn.

[21] Appl. No.: 08/891,902

[22] Filed: Jul. 14, 1997

[51] Int. Cl.$^6$ .................................................. B32B 17/00
[52] U.S. Cl. ..................... 428/432; 428/701; 428/702; 359/269; 427/165; 427/372.2
[58] Field of Search ................... 428/432, 701, 428/702; 359/269; 427/165, 372.2

[56] References Cited

U.S. PATENT DOCUMENTS 5,209,980  5/1993  Spindler ................................ 428/432

OTHER PUBLICATIONS

D.W. Murphy, P.A. Christian, F.J. DiSalvo, and J. V. Waszczak, "Lithium Incorporation by Vanadium Pentoxide," Inorganic Chemistry, vol. 18, No. 10, 1979, pp. 2800–2803.

J.M. Cocciantelli, M. Menetrier, C. Delmas, J.P. Doumerc, M. Pouchard and P. Hagenmuller, "Electrochemical and structural characterization of lithium intercalation and deintercalation in the γ–LiV$_2$O$_5$ bronze," Solid State Ionics 50 (1992), pp. 99–105.

C. Delmas, H. Cognac–Auradou, J.M. Cocciantelli, M. Menetrier, J.P. Doumerc, "The Li$_x$V$_2$O$_5$ system: An overview of the structure modifications induced by the lithium intercalation," Solid State Ionics 69 (1994) pp. 257–264.

Stuart F. Cogan, Nguyet M. Nguyen, Stephen J. Perrotti, and R. David Rauh, "Optical properties of electrochromic vanadium pentoxide," J. Appl. Phys. 66(3), Aug. 1, 1989, pp. 1333–1337.

A. Talledo, A.M. Anderson, and C.G. Granqvist, "Structure and optical absorption of Li$_y$V$_2$O$_5$ thin films," J. Appl. Phys. 69 (5), Mar. 1, 1991; pp. 3261–3265.

Rajendra Singh and Randhir P.S. Thakur, "RIP for Dielectrics, It Doesn't Mean Rest in Peace," The Electrochemical Society Interface, Fall 1995, pp. 28–31.

*Primary Examiner*—Timothy M. Speer
*Attorney, Agent, or Firm*—Lerner, David, Littenberg, Krumholz & Mentlik, LLP

[57] ABSTRACT

Electrochromic devices are disclosed in which the counterelectrode layer is a gamma phase Li$_x$V$_2$O$_5$ layer in which x is between about 0.7 and 2.0. In addition, methods of producing electrochromic devices are disclosed including such counterelectrode layers which are heat treated at temperatures of greater than about 260° C. to convert the counterelectrode layer into such a gamma phase Li$_x$V$_2$O$_5$ layer.

23 Claims, 2 Drawing Sheets

— 1 —

COUNTERELECTRODE LAYER

This invention was made with government support under the Cooperative Agreement No. 70NANB3H1377 awarded by the National Institute of Standards and Technology of the Department of Commerce. The United States Government has certain rights in the Invention.

FIELD OF THE INVENTION

The present invention relates to electrochromic devices. More particularly, the present invention relates to improved electrochromic devices having a counterelectrode layer having improved transmissive properties. Still more particularly, the present invention relates to methods for producing such electrochromic devices.

BACKGROUND OF THE INVENTION

Electrochromic materials are now known which change their optical properties in response to the application of an electric current or potential. A variety of solid-state inorganic electrochromic layers have thus been devised including those effecting color change based on the dual injection of electrons and ions, particularly Group VI-B oxides, such as $WO_3$ and $MoO_3$. In general, these electrochromic devices will include a structure which consists of sequential layers including a layer of an electrically conductive material, an electrode formed from a layer of electrochromic material, an ion-conducting layer, a counterelectrode layer, and another electrically conductive layer. In a first condition of these electrochromic devices, each of the aforementioned layers is optically transparent such that a majority of the optical energy incident on the device will be transmitted therethrough. Upon the application of an electrical potential across these layers, however, the optical properties of the electrochromic material will change such that the electrochromic layer will become less transparent, thereby preventing the transmission of much of the optical energy therethrough.

These electrochromic devices have a significant number of potential uses, particularly in controlling the transmission of optical energy through windows, particularly the large windows of office buildings and other such structures. The efforts to capitalize on these benefits have been developing for many years, and improved electrochromic devices are now being devised.

Among the most significant parameters in developing such electrochromic devices, however, have been to improve the transmissive properties of each of the layers, including the counterelectrode layer itself. In general, the most widespread material used for these counterelectrode layers has been vanadium oxide ($V_2O_5$). Spindler, U.S. Pat. No. 5,209,980, discloses transparent counterelectrodes which have been developed. In this case, alternative transparent complementary counterelectrodes are disclosed using films such as indium hexacyanoferrate, gadolinium hexacyanoferrate, and gallium hexacyanoferrate. These films are produced by electroplating onto a conductive surface, such as a tin-oxide-coated glass substrate. In each of these electrochromic devices, upon the application of an electrical potential across the two electrodes, ions which are present in the electrolyte are absorbed by one of the electrodes producing a change in color or transmissivity of the electrode. Reversal of the current in the circuit reverses the chemical reaction, and the changed electrode then reverts to its original condition. The purpose of the counterelectrode is to "store" a large quantity of these ions, such as lithium ions or protons, and associated electrons in a transparent state. That is, the bleached state transmission of most of these electrochromic devices tends to be limited by the transmissivity of the counterelectrode itself. Therefore, the search has continued for counterelectrodes which are more highly transmissive when "fully charged" than has previously been the case. A slight improvement in these transmissive properties of the counterelectrode can have a dramatic effect upon the bleached state transmission of the electrochromic device itself.

Vanadium oxides and lithium vanadium oxides are known to exist in different forms. Thus, vanadium oxide can exist in the alpha ($\alpha$) crystalline form or amorphous state. In the prior art devices employing lithium counter ions, it has been shown that the room-temperature addition of lithium to $\alpha$-$V_2O_5$ having a molar ratio of lithium to vanadium of about 1 yields epsilon ($\epsilon$) form of the compound, or $\epsilon$-$Li_xV_2O_5$. In addition, it is also known that this epsilon form of $Li_xV_2O_5$ converts to a gamma ($\gamma$) form of the compound, or $\gamma$-$Li_xV_2O_5$ at a temperature of about 300° C. A stability diagram showing these forms of vanadium oxide is set forth in FIG. 1. (See Murphy, D. W. et al., "Lithium Incorporation by Vanadium Pentoxides," *Inorganic Chemistry*, Vol. 18, pp. 2000–2803 (1979)). The search has, continued for counterelectrodes of this type having better transmissive properties.

SUMMARY OF THE INVENTION

In accordance with the present invention, these and other objects have now been realized by the discovery that the use of a particular form of vanadium oxide as a counterelectrode in electrochromic devices yields a significant improvement in its transmissive properties. Thus, the use of (gamma) $\gamma$-$Li_xV_2O_5$ in accordance with the present invention yields these results. In accordance with one embodiment of the electrochromic devices of the present invention, the electrochromic devices comprise an electrochromic layer as a first electrode, a counterelectrode layer as a second electrode, and a lithium ion-conducting layer for conducting lithium ions between the first and second electrodes, the counterelectrode layer comprising $\gamma$-phase $Li_xV_2O_5$ wherein x is between about 0.7 and 2.0. Preferably, x is substantially equal to 1.

In a highly preferred embodiment, an 1800 Å thick film of the $\gamma$-phase $Li_xV_2O_5$ deposited on a LOF TEC-20 conductive substrate has a photopic transmission of greater than about 62%.

In accordance with a preferred embodiment of the electrochromic device of the present invention, the electrochromic device includes a plurality of the counterelectrode layers, and, in particular, the $\gamma$-phase $Li_xV_2O_5$ layers thereof. Preferably, the electrochromic device includes at least one intermediate layer between the plurality of counterelectrode layers. In a preferred embodiment, the at least one intermediate layer comprises a conductive metal oxide layer, most preferably tungsten trioxides. In another embodiment, the at least one intermediate layer is less than about 50 angstroms thick.

In accordance with the method of the present invention, a method for producing an electrochromic device deposited on a substrate has been discovered which comprises depositing an electrochromic layer acting as a first electrode on the substrate, depositing a counterelectrode layer comprising amorphous $Li_xV_2O_5$, wherein x is between about 0.7 and 1.5, acting as a second electrode, and depositing a lithium ion-conducting layer between the first and second electrodes, including heat treating the electrochromic device at a temperature of greater than about 260° C. so as to convert the counterelectrode layer into crystalline γ-phase $Li_xV_2O_5$. Preferably, the heat treating step is carried out under an inert atmosphere or vacuum. Most preferably, the heat treating step is carried out using an optically radiant heat source at a substrate temperature of between about 260° C. and 500° C., preferably greater than about 300° C.

BRIEF DESCRIPTION OF THE DRAWINGS

The present invention may be more fully appreciated with reference to the following detailed description, which, in turn, refers to the drawings, in which.

DETAILED DESCRIPTION

For the purposes of the present invention, the electrochromic devices hereof will be discussed in connection with their potential use to control the transmission of light through a window. It should be appreciated, however, that these electrochromic devices are useful in a wide variety of applications, including use in display devices, variable reflectants, mirrors, lenses, and similar devices in which the ability to selectively control the transmission of optical energy through a transparent structure would be beneficial.

Figure 1:
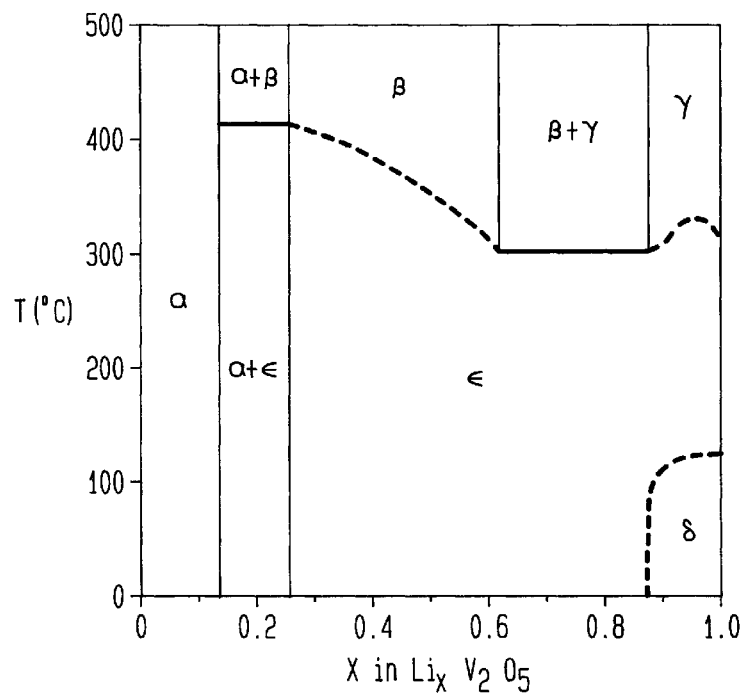
FIG. 1 is a stability diagram of various forms of vanadium pentoxide as shown in the prior art.
Figure 2:
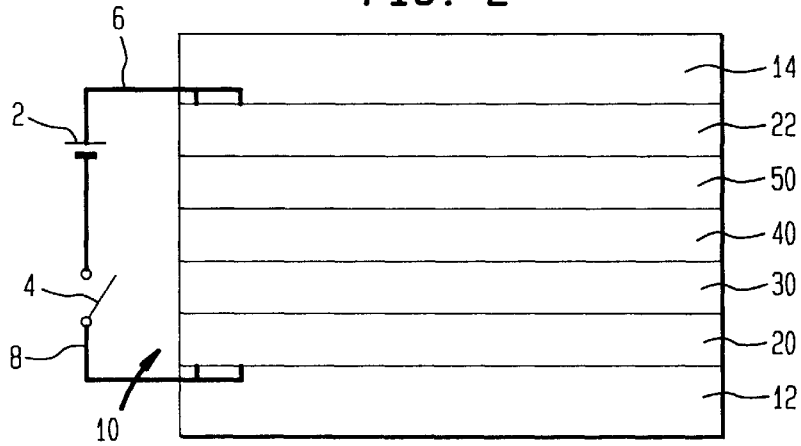
FIG. 2 is a highly schematic cross-sectional view of an electrochromic device in accordance with the prior art and in accordance with the present invention.

The general structure of an electrochromic device in accordance with the present invention is shown schematically in cross-section in FIG. 2 hereof. The window itself consists of a series of sequential layers, including a transparent glass substrate 12, a transparent conductive oxide layer 20, an electrochromic layer 30, an ion-conducting layer 40, a counterelectrode layer 50, another transparent conductive oxide layer 22, and a transparent glass superstrate layer 14. A low-voltage battery 2, and switch 4 are connected to the layered structure by means of conductive wires 6 and 8. In order to alter the optical properties of the window itself, switch 4 is closed whereupon battery 2 will cause an electrical potential to be created across the layered structure. The polarity of the battery will govern the nature of the electric potential created and thus the direction of ion and electron flow. Thus, in accordance with FIG. 2, the electric potential created as switch 4 is closed will cause ions to flow from the counterelectrode layer 50 through the ion-conducting layer 40 to the electrochromic layer 30, thereby reducing the electrochromic material to its so-called "colored" state. In this state, the transparency of window 12 is substantially reduced as a large portion of the optical energy incident on window 30 is absorbed and reflected by the electrochromic electrode layer 30. Window 12 is said to have a "memory" in that electrochromic layer 30 will remain in this colored state even when switch 4 is opened, provided that ion-conducting layer 40 is also electrically insulating. However, when the polarity of battery 2 is reversed and switch 4 is closed, the applied electrical potential will cause ions to flow in the reverse direction from the electrochromic electrode layer 30 through the ion-conducting layer 40 to the counterelectrode layer 50, thereby oxidizing the electrochromic material to its so-called "bleached" state in which the transparency of window 12 is at a maximum.

In fabricating window 12 described above, layers 20 and 22 may be formed from any transparent oxides which are highly electron conducting, such as doped tin oxide, doped zinc oxide, tin-doped indium oxide and similar materials. The materials for forming layers 20 and 22 need not be the same. Electrochromic electrode 30 is typically formed from a material whose optical properties can be reversibly altered as its state of oxidation changes. The thickness of electrochromic electrode layer 30 will normally be such that, in the colored state, an acceptable reduction in the transparency of the window is obtained. A widely used material in this regard is tungsten oxide ($WO_3$), although other suitable materials may be used, such as molybdenum oxide, nickel oxide, iridium oxide, niobium oxide, titanium oxide, and mixtures of the foregoing oxides. The ion-conducting layer 40 is used to transport ions into and out of the electrochromic layer 30, and must exhibit and maintain two electrically opposed properties. That is, ion-conducting layer 40 must readily transmit ions upon the application of an electrical potential, yet must remain electrically insulating with respect to the transmission of electrons. In that regard, ion-conducting layer 40 must have a thickness sufficient to avoid the possibility of electron arcing or shorting between the electrochromic electrode layer 30 and the counterelectrode layer 50. Suitable materials for forming ion-conducting layer 40 for the transmission of lithium ions include, for example, lithium silicate, lithium borosilicate, lithium aluminum silicate, lithium niobate, lithium nitride, and lithium aluminum fluoride; and suitable materials for transmitting hydrogen ions include tantalum pentoxide and silicon dioxide. Alternatively, ion-conducting layer 40 may be formed from a polymer material.

In the past, the counterelectrode layer 50 has been formed from materials capable of storing ions and then releasing these ions for transmission to the electrochromic layer 30 in response to an appropriate electrical potential. The thickness of the counterelectrode layer is preferably such that the counterelectrode layer is capable of transmitting a large enough quantity of ions to the electrochromic layer to effect an acceptable color change in that layer. Counterelectrode materials which have been used in the past, such as vanadium oxide, are also electrochromic in their own right in that their optical properties may change as they give up or receive ions in response to an application of electrical potential. These counterelectrode materials which have an electrochromic nature may, therefore, complement the effect that an electric potential has on the optical properties of the electrochromic materials. These counterelectrode materials will thus become less transparent as they release ions to convert the electrochromic material to the colored state, and at the same time may become more transparent as they receive ions upon conversion of the electrochromic material to the bleached state.

Thus, in accordance with the present invention, it has been a highly desirable objective to increase the transmissive properties of the electrochromic material when it is "storing" these ions and the electrochromic material has been converted to its bleached state.

Each of the layers described above may be deposited by known techniques, provided that discrete and continuous individual layers are formed. The particular method of deposition for each layer depends upon several parameters, including the material being deposited, the thickness of the layer being deposited, the materials deposited in previous layers, etc. Deposition techniques including RF sputtering, chemical vapor deposition, plasma enhanced chemical vapor deposition, electron beam evaporation, sol-gel techniques, and other known methods for depositing thin films are typically used.

A particularly preferred technique for depositing the various layers described in the specification is that disclosed in U.S. patent application Ser. No. 07/996,730 filed on Dec. 24, 1992, the disclosure of which is incorporated herein by reference thereto. In particular, the technique of that invention is a sol-gel technique which produces an ion-conducting layer 40, for example, which has a relatively open nature, and in which the presence of interconnected nanoscale porosity is contained therein. Such nonporous gels, therefore, exhibit both high ionic mobility and high degrees of ion concentration. In deposition the ion-conducting layer 40, for example, the technique of that patent primarily introduces a layer of inorganic material prepared from and including residue from organic constituents. The ion-conducting layer in that case is thus primarily exclusively inorganic material, possibly with a small amount of hydroxyl and/or organic residue which is primarily the residue of alkoxide groups used to prepare these layers and/or residual solvents. In any event, because of the solution-based methods disclosed in that patent for preparing these layers, they can have carefully controlled thicknesses. This is contrasted, for example, to prior such techniques employing polymeric electrolyte layers which have far greater thicknesses which cannot be controlled in this manner.

During the fabrication process, at least one of the electrochromic electrode layer 30 and the counterelectrode layer 50 may be inserted with lithium ions, unless these ions are already present in one of these layers in its deposited form. Ion insertion may be accomplished by treating layer 30 or layer 50 with a suitable reducing agent. For example, n-butyl lithium may be used for lithium insertion. Alternatively, ion insertion may be accomplished by a vacuum processing step, such as sputtering from a target serving as a source of suitable ions, such as a lithium metal target. Ion insertion may also be accomplished electrochemically by reduction in an appropriate ion-containing electrolyte. A still further technique is to deposit a layer of the reduced material directly by vapor deposition in a reducing atmosphere which will react with the source or target material to form the desired composition, or by using a source or target having the reduced composition. Still another technique for insertion uses a volatile precursor and ignites a low vapor pressure discharge to dissociate the insertion ion from the precursor. For example, an organic lithium compound in the form of a gaseous precursor may be dissociated so that lithium ions come into contact with the material into which they are to be inserted.

Figure 3:
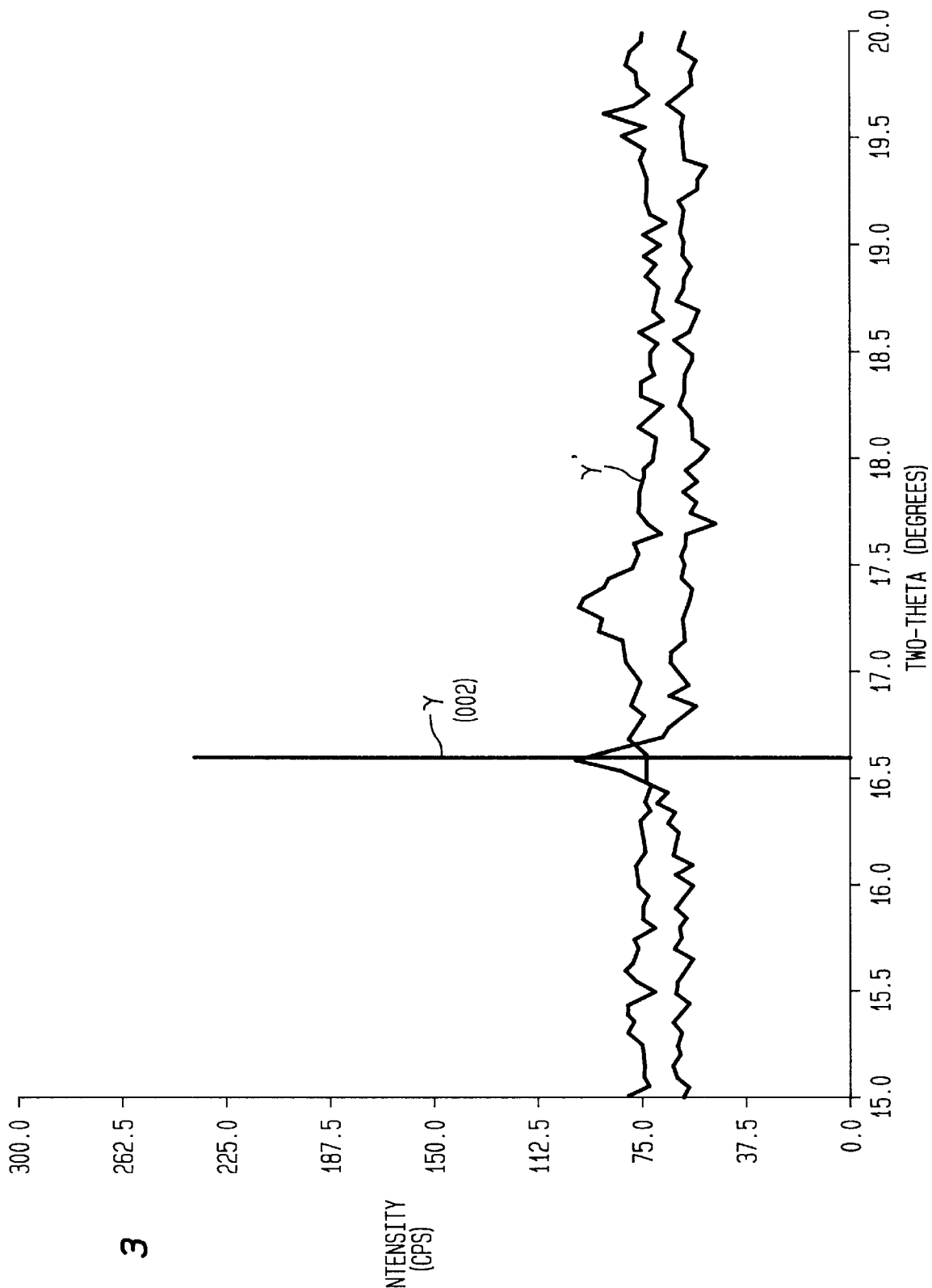
FIG. 3 is a graphical representation of an X-ray diffraction pattern of the material used in the counterelectrode layers of the present invention.

In order to form the γ-phase $Li_xV_2O_5$ film in accordance with the present invention, after the vanadium oxide film has been deposited in accordance with the above discussion, and after lithium ions have been introduced to form the $Li_xV_2O_5$ layer in which x is between about 0.7 and 1.5, preferably about 1, the γ-phase $Li_xV_2O_5$ film is produced by heat treating the counterelectrode layer at a temperature of greater than about 260° C., but preferably such heat treating is carried out at temperatures between about 260° C. and 500° C., preferably greater than about 300° C., and is most preferably conducted in an inert or vacuum atmosphere. It has thus been found that by such heat treatment, the γ-phase $Li_xV_2O_5$ film is produced having an x-ray diffraction pattern substantially as shown by the particular x-ray lines designated by γ in FIG. 3 hereof. Also shown in FIG. 3 are the x-ray patterns for the γ'-phase of $V_2O_5$ formed by room temperature deintercalation of lithium from γ phase $Li_xV_2O_5$ as designated by γ' thereon. The lattice parameters for the γ-phase $Li_xV_2O_5$ material are as follows: a=9.69; b=3.59; and c=10.66 (see J. M. Cocciantelli et al., *Solid State Ionics*, 50 (1992), pp. 99–105.

While the initial loading of lithium is limited to a stoichiometry (x) of about 1.5 by consideration of phase stabilities at elevated temperature, additional lithium may be added to the counterelectrode film at ambient temperatures. Thus, after heat treating, additional lithium may be added to the γ-phase $Li_xV_2O_5$ film up to about x=2, while maintaining good cycling stability at ambient temperatures.

While the heat treating may be carried out by a number of means, including standard thermal heating, and the like, it has been found to be preferable to heat treat in an inert atmosphere with a radiant source such as a quartz halogen lamp in order to speed the conversion process, as compared, for example, to standard thermal heating. Similar benefits of using optically radiant heating sources have been demonstrated in the field of integrated circuit technology toward the formation of dielectric films in the manufacture of integrated circuits. (See, "RIP for Dielectrics," R. Singh and R. Thakur, *The Electrochemical Society Interface*, Fall 1995 p. 28–31). So-called Rapid Isothermal Processing involves heating processes which employ optically radiant heat sources. High energy photons provide photophysical and photochemical effects which may enhance the rate of physical and chemical conversion processes, or allow them to occur at a lower substrate temperature as compared to conventional heat treatment. The conversion of the lithium vanadium oxide counterelectrode material from the amorphous state, which is brown, to the crystalline state, which is light green/blue, is easily observed visually. Conversion proceeds rapidly (within several minutes) with a vacuum heat treatment at 300° C. employing a quartz-halogen radiant heat source, whereas conversion is quite slow (hours) using standard resistive-element heating under an inert Argon atmosphere at the equivalent 300° C. substrate temperature.

Figure 4:
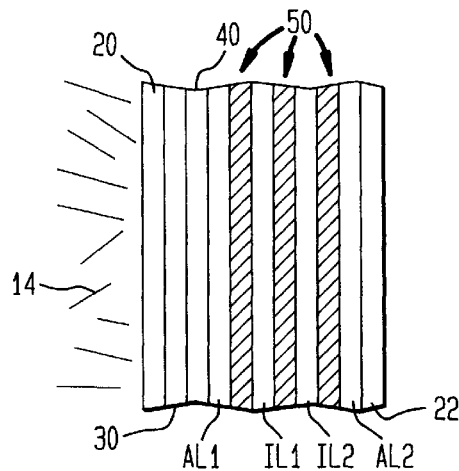
FIG. 4 is a schematic representation of an electrochromic device of the present invention incorporating the counterelectrode layer with intermediate enhancing layers.

One difficulty often encountered in fabrication of the $Li_xV_2O_5$ film relates to excessive growth of crystals in the film. Microcrystals, several to many microns in diameter, tend to grow quickly on conversion of amorphous $Li_xV_2O_5$ to crystalline γ-$Li_xV_2O_5$. The resulting crystal mosaic scatters light, leading to unacceptable levels of haze in the electrochromic device. To reduce haze from grain-boundary light scattering, intermediate layers of other metal oxides may be beneficially used. The intermediate layers modify the growth of γ-$Li_xV_2O_5$ crystals and impede the development of a light-scattering crystal mosaic. A metal oxide with mixed ionic/electronic conductivity is preferred in order to maintain the necessary mixed ionic/electronic conductivity of the counter electrode layer. FIG. 4 illustrates the inclusion of two such intermediate layers, labeled IL1 and IL2, which are interspersed within the counterelectrode film. For example, by including several thin (~50 Å) intermediate layers of $WO_3$ dispersed through a 1800 Å thick film of γ-$Li_xV_2O_5$ substantially eliminates haze in the ultimate electrochromic device.

Another problem frequently encountered with such films is poor adhesion. The interfaces made between the γ-$Li_xV_2O_5$ counterelectrode and surrounding layers have thus been found to be susceptible to failure with a tape test. This problem may be solved by including layers which adhere well to the γ-Li$_x$V$_2$O$_5$ layer, as well as to the layers adjacent to the counterelectrode. FIG. 4 illustrates the inclusion of adhesion-promoting layers AL1 at the ion-conductor 40/counterelectrode 50 interface and AL2 at the counterelectrode 50/transparent conductor 22 interface. When AL1 and AL2 are thin layers (~50 Å) of WO$_3$, resulting device are much less prone to failure with a tape test.

EXAMPLE 1

In order to compare the transparency of three different vanadium oxide films charged with equivalent amounts of lithium, the following experiment was conducted.

Firstly, onto substrates of glass coated with a conductive film of fluorine-doped tin oxide (LOF TEC-20 glass), a first substrate film of 1800 angstrom thick amorphous vanadia (a-V$_2$O$_5$) was applied. A second film of 1800 angstrom thick amorphous V$_2$O$_5$ film was heat treated under a vacuum at 300° C. to yield crystalline α-V$_2$O$_5$. The third 1800 angstrom thick amorphous V$_2$O$_5$ film was lithiated to produce Li$_x$V$_2$O$_5$ with x approximately equal to 1, and then further heat treated under vacuum at 300° C. to yield γ-Li$_x$V$_2$O$_5$. This was confirmed by x-ray diffraction analysis. Lithium was electrochemically removed from the third sample by oxidation at +1.5 V versus Ag/AgCl in a lithium triflate/acetonitrile electrolyte to form γ'-V$_2$O$_5$. Thereafter, areas of 12 cm$^2$ for each of the three films were placed in a wet cell and galvanistically cycled at +/−1 mA between x=0 and x=1 (20 mC/cm$^2$ of lithium). A small amount of irreversible "bound" charge was satisfied for each of the three samples. Each film was then charged to a level of 20 mC/cm$^2$, and the photopic transmission measurements were taken as follows:

| FILM | PHOTOPIC TRANSMISSION (%) |
| --- | --- |
| a-Li$_x$V$_2$O$_5$ | 58.0 |
| ε-Li$_x$V$_2$O$_5$ | 61.5 |
| γ-Li$_x$V$_2$O$_5$ | 63.0 |

EXAMPLE 2

This example pertains to the fabrication of an all-ceramic thin-film Li-ion electrochromic device with a γ-Li$_x$V$_2$O$_5$ counterelectrode layer. First, a layer of tungsten trioxide, 3800 Å thick, is deposited by DC magnetron reactive sputtering onto a transparent conductive substrate oxide (LOF TEC-20 glass) consisting of glass coated with fluorine-doped tin oxide (FTO). Next, a lithium-ion conductive layer is deposited by a dip coating process and heat treatment step to yield a partial device structure: Glass\FTO\WO$_3$\IC where IC represent the amorphous lithium-ion conductive ceramic electrolyte. Following the IC deposition, an amorphous film of vanadium pentoxide, 1800 Å thick, is deposited by DC magnetron reactive sputtering. Next the partial device structure is charged with the necessary counter-ion by sputtering a metallic lithium target with an inert process gas, such as He or Ar. Next, a transparent conductive layer of indium tin oxide (ITO) is deposited by DC magnetron reactive sputtering from a ceramic ITO target. Finally, the substrate is heat treated for several minutes at 380° C. in a vacuum using a radiative quartz-halogen heating array.

An x-ray diffraction (XRD) pattern of the completed device shows crystalline phases of tungsten trioxide, FTO, ITO, and γ-Li$_x$V$_2$O$_5$.

Next, busbars are attached to the two transparent conductor layers and the device is incorporated into a desiccated insulating glass unit (IGU). The photopically integrated bleached state transmission of the IGU with the electrochromic device is 55%. By applying a 3 volt coloring potential between the device electrodes, the transmission is reduced to 8%.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. An electrochromic device comprising an electrochromic layer as a first electrode, a counterelectrode layer as a second electrode, and a lithium ion-conducting layer for conducting lithium ions between said first and second electrodes, said counterelectrode layer comprising gamma phase Li$_x$V$_2$O$_5$ wherein x is between about 0.7 and 2.

2. The electrochromic device of claim 1 where x is substantially equal to 1.

3. The electrochromic device of claim 1 wherein said gamma phase Li$_x$V$_2$O$_5$ has a photopic transmission of greater than about 62%.

4. The electrochromic device of claim 1 including a plurality of said counterelectrode layers.

5. The electrochromic device of claim 4 including at least one intermediate layer between said plurality of counterelectrode layers.

6. The electrochromic device of claim 5 wherein said intermediate layer comprises a conductive metal oxide layer.

7. The electrochromic device of claim 5 wherein said conductive metal oxide layer comprises tungsten trioxide.

8. The electrochromic device of claim 4 wherein said at least one intermediate layer is less than about 50 Å thick.

9. The electrochromic device of claim 1 including at least one contact layer between said counterelectrode layer and an adjacent layer thereto.

10. The electrochromic device of claim 9 wherein said at least one contact layer comprises a conductive metal oxide layer.

11. The electrochromic device of claim 10 wherein said metal oxide layer comprises tungsten oxide.

12. A method of producing an electrochromic device deposited on a substrate which comprises depositing an electrochromic layer acting as a first electrode on said substrate, depositing a counterelectrode layer comprising Li$_x$V$_2$O$_5$ wherein x is between about 0.7 and 1.5 acting as a second electrode, depositing a lithium ion-conducting layer between said first and second electrodes, and heat treating said electrochromic device at a temperature of greater than about 260° C. so as to convert said counterelectrode layer into gamma phase Li$_x$V$_2$O$_5$.

13. The method of claim 12 comprising heat treating said electrochromic device under an inert atmosphere or in a vacuum.

14. The method of claim 12 wherein said heat treating of said electrochromic device is carried out at a temperature of between about 260° C. and 500° C.

15. The method of claim 14 wherein said heat treating of said electrochromic device is carried out at a temperature of greater than about 300° C.

16. The method of claim 12 including incorporating sufficient lithium into said counterelectrode layer so as to provide said gamma-phase Li$_x$V$_2$O$_5$ wherein x is between about 0.7 and 2.

17. The method of claim 12 comprising depositing said counterelectrode layer in the form of a plurality of said counterelectrode layers.

18. The method of claim 17 including depositing at least one intermediate layer between said plurality of counterelectrode layers.

19. The method of claim 18 wherein said at least one intermediate layer comprises a conductive metal oxide layer.

20. The method of claim 19 wherein said conductive metal oxide layer comprises tungsten oxide.

21. The method of claim 12 including depositing at least one contact layer between said counterelectrode layer and an adjacent layer thereto.

22. The method of claim 21 wherein said at least one contact layer comprises a conductive metal oxide layer.

23. The method of claim 22 wherein said conductive metal oxide layer comprises tungsten oxide.

* * * * *

UNITED STATES PATENT AND TRADEMARK OFFICE
CERTIFICATE OF CORRECTION

PATENT NO. : 5,919,571
DATED : July 6, 1999
INVENTOR(S) : Badding et al.

It is certified that error appears in the above-identified patent and that said Letters Patent is hereby corrected as shown below:

Column 2, line 24, after "has" delete --,--.

Column 7, line 27, "x=1" should read --x $\cong$ 1--.

Signed and Sealed this

First Day of February, 2000

Attest:

Q. TODD DICKINSON

*Attesting Officer*  *Acting Commissioner of Patents and Trademarks*